Oct. 8, 1968 AKIRA SHIIKI 3,404,701
PROCESS REGULATING SYSTEM
Filed June 30, 1965 4 Sheets-Sheet 1

INVENTOR.
AKIRA SHIIKI
BY Arthur H. Swanson
ATTORNEY

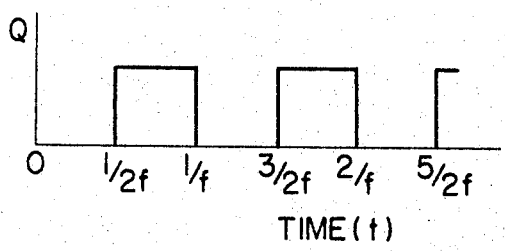
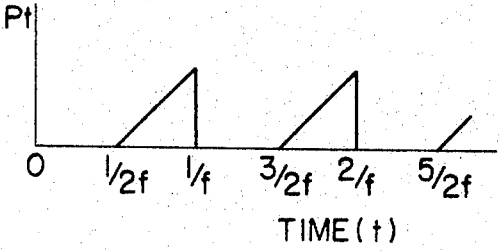
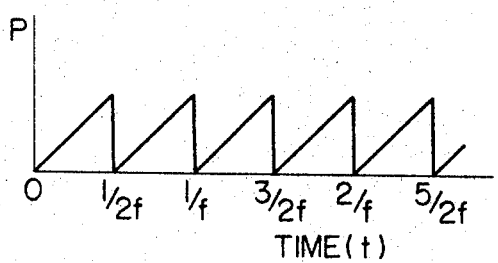

United States Patent Office 3,404,701
Patented Oct. 8, 1968

3,404,701
PROCESS REGULATING SYSTEM
Akira Shiiki, Tokyo, Japan, assignor to Honeywell Inc., Minneapolis, Minn., a corporation of Delaware
Filed June 30, 1965, Ser. No. 468,273
Claims priority, application Japan, July 6, 1964, 39/38,532
4 Claims. (Cl. 137—81.5)

ABSTRACT OF THE DISCLOSURE

A process regulating system for controlling a process having a pair of bellows for sensing a process variable. A fluid amplifier connects to the bellows and undergoes a change of oscillating frequency whenever a change occurs in the process variable. A pair of fluid amplifiers serve as digital-analogue converters for converting the frequency shift to a pressure which is applied to a valve or other suitable device for returning the process to its set point.

---

The present invention relates to a simple type process regulating system and, more particularly, to a fluid operated process controller utilizing pure fluid amplifiers. In the prior art process regulating systems, it has often been experienced that a detector, for sensing a variation in the process being controlled; a regulator or controller, for comparing the sensed process variable against a set point and providing a correctional output signal in response thereto; and an operator which receives the regulator output signal and adjusts the process being controlled are manufactured individually and are separately assembled to form the system. Under these conditions the conventional process regulating system requires a large installation area and is further complicated by the inconvenience of installation and adjustment of the assembled system. Further, the conventional process regulating system utilizes many components within each assembly. One example of a typical prior art process regulator or controller may be found in Patent No. 3,099, 281, by R. B. Watrous et al., which issued July 30, 1963 and is assigned to the same assignee as the present invention.

Accordingly, an object of the present invention is to provide a process regulating system assembled integrally into a single unit for skillfully avoiding the defects of the prior art process control systems. A further object of the present invention provides a process regulating system which utilizes fluid amplifiers to construct a regulator or controller having substantially no moving components.

Another object of the subject invention is to provide a miniaturized and integrated process regulating system which can decrease the installation area thereof and make the installation, adjustment and maintenance thereof considerably easier.

Further objects and many of the attendant advantages of the present invention will become apparent when considered in light of the following specification as illustrated in detail in conjunction with the attached drawings, wherein:

FIG. 3 and FIG. 4 show the relation between the signal stream flow rate to time and the signal stream pressure to time at different places; and FIG. 5 shows the relation between the signal pressure to time at the output of the regulator of the present invention.

Figure 1:
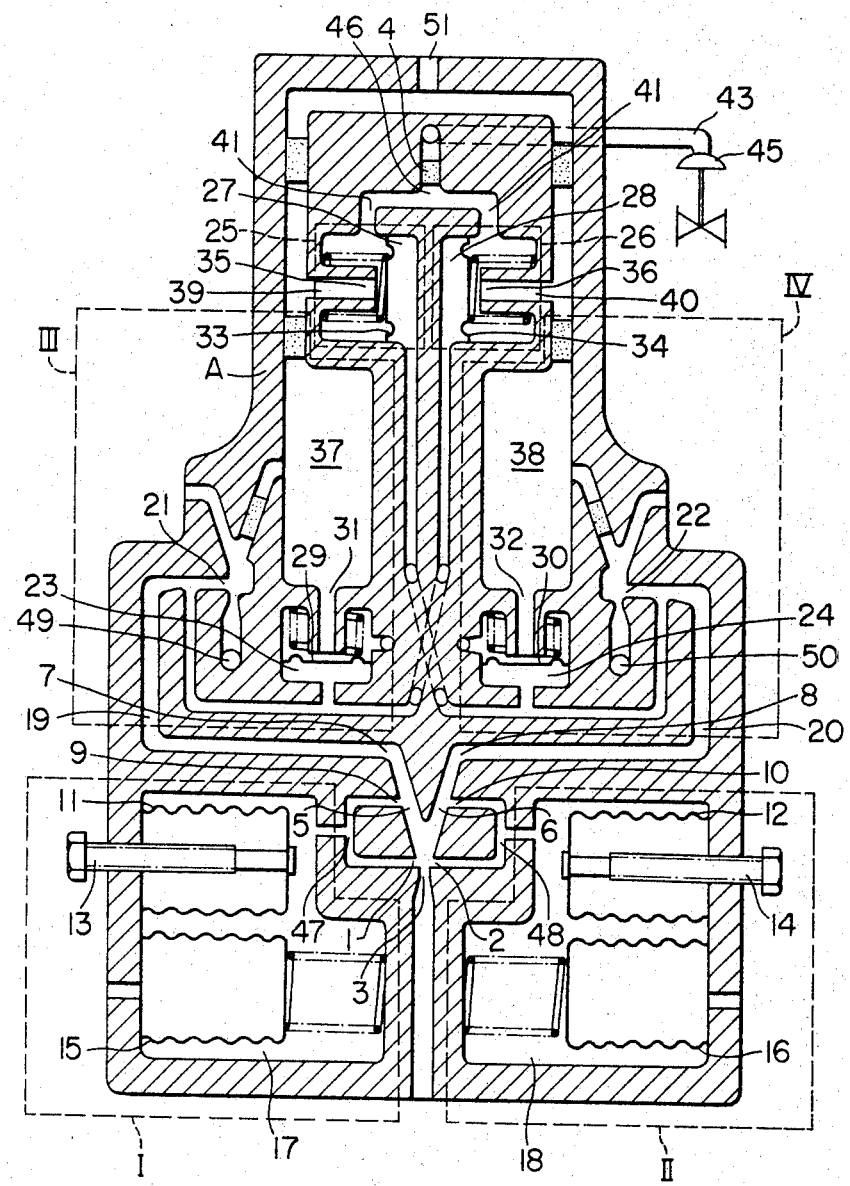
FIG. 1 is a sectional front view of a process regulating system provided in accordance with the present invention.

Referring to FIG. 1, A is a case, in which various kinds of apparatus illustrated hereinafter are assembled together by a technique well known in the fluid amplifier art. A first fluid amplifier arranged as an oscillation unit is shown in FIG. 1 comprises a control gate 1, and a control gate 2 connected to opposite sides of a supply nozzle 3; a channel 5 and a channel 6 connecting the nozzle 3 to an outlet 7 and an outlet 8, respectively; and a control gate inlet 9 and a control gate inlet 10 connecting the channels 5 and 6 to respective control gates, 1 and 2. In the oscillation unit, a jet stream jetted from control gate 1 operates to bias a power jet stream jetted from nozzle 3 into channel 6. A majority of said power jet stream is supplied to outlet 8 and the remainder of said power jet stream is supplied to control gate 2 from control gate inlet 10. Thus, the remainder of the jet stream is jetted from control gate 2 for switching the power jet stream from nozzle 3 to flow into channel 5. Some of said power jet stream supplied to channel 5 and its outlet 7 is feedback from inlet 9 to control gate 1 and thereby the power jet stream is switched again to flow into channel 6. Thus, the first fluid amplifier provides oscillating operation and the oscillation frequency thereof is determined by a capacity of the feedback loops formed by the control gate inlets 9 and 10 and control gates 1 and 2, respectively.

Figure 2:
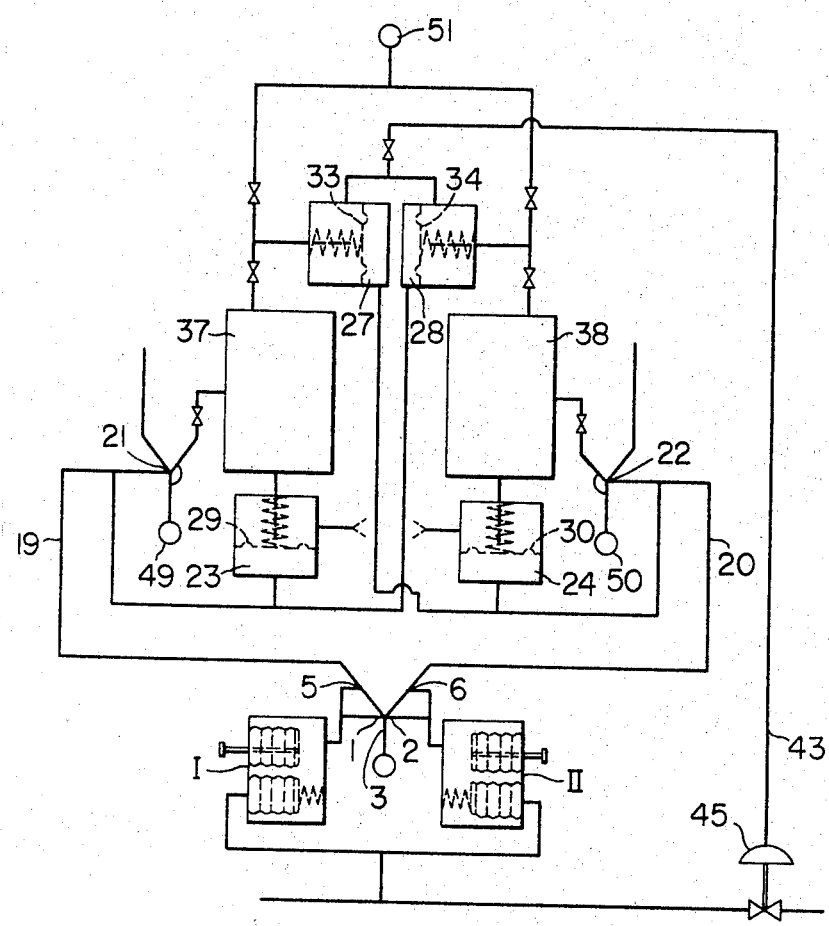
FIG. 2 is a circuit diagram of the system shown in FIG 1.

Referring to FIG. 1 and FIG. 2, a detector or sensing unit is shown including a pair of bellows units I and II connected to the feedback loops formed by the control gate inlets 9 and 10 and the control gates 1 and 2. The bellows units include a pair of set point bellows 11 and 12 which are compensated by means of adjusting screws 13 and 14 for varying the volume thereof in response to the desired set point. A pair of process variable sensing bellows 15 and 16 are arranged within volume chambers 17 and 18 along with set point bellows 11 and 12 for completing the bellows units. The bellows units may be constructed from several suitable materials, such as rubber, metal, or plastic and expand or contract in response to the setting of the adjusting screws 13 and 14 or the value of a variable process pressure applied thereto. In other words, the set point and the detected process variable are converted into volumes of bellows 11 and 12 and bellows 15 and 16, respectively. When there occurs some volume variation in the set point bellows or the process variable sensing bellows, the volumes of chambers 17 and 18 vary to change the capacity of the feedback loop in the oscillation unit to which they are connected and thereby to change the oscillation frequency thereof, as will be explained hereinbelow.

Referring to FIG. 1 again, units III and IV, each encircled by a broken line, include second and third fluid amplifiers that are part of digital-analogue converters which convert the oscillation pulses of the signal stream supplied from said oscillation unit to a pressure signal. The digital-analogue converters III and IV are identical to the unit described in my copending patent application, now Patent No. 3,288,365, which issued November 29, 1966 and, therefore, need not be described in detail herein. A signal outlet 19 from the oscillation unit I is connected to a control gate 21 and a pressure chamber 23 of the converter unit III. The same channel which connects the signal outlet 19 to the pressure chamber 23 also connects to a pressure chamber 28 within a lock-up valve 26. The signal stream supplied to pressure chamber 23 actuates to urge up a diaphragm 29, which forms one wall therein, for closing an exhaust outlet 31 located on the opposite side thereof. The exhaust outlet 31 is provided within an internal pressure tank 37 that is supplied with a fluid from a supply inlet 49 when the signal stream is present at control gate 21. The signal stream supplied to pressure chamber 28 urges a diaphragm 34 located therein to close a connection gate 36 which forms a portion of the lock-up valve 26. The connection gate 36 connects the pressure chamber 28 to a channel 40 having restrictions located therein for communicating with a supply inlet 51 and a second internal pressure tank 38, respectively. In a similar manner, a signal outlet 20 from the oscillation unit II is connected to a control gate 22 and a pressure chamber 24 of a second digital-analogue converter unit IV. The channel connecting the signal outlet 20 to the pressure chamber 24 also connects the outlet to a pressure chamber 27 within a second lock-up valve 25. The signal stream supplied to the pressure chamber 24 urges a diaphragm 30, which forms a wall of the chamber, upwardly for closing an exhaust outlet 32 located on the opposite side thereof. The exhaust outlet 32 connects to the pressure tank 38 that is supplied with a fluid from supply inlet 50 when the signal stream is present at control gate 22. The signal stream supplied to pressure chamber 27 urges a diaphragm 33 located therein to close a connection gate 35 which forms part of the lock-up valve 25. The connection gate 35 connects the pressure chamber 27 through channel 39 and restrictions provided therein to communicate respectively with the supply inlet 51 and the first pressure tank 37.

Accordingly, when a signal stream pulse is supplied to control gate 21, the supply stream from supply inlet 49 is switched into pressure tank 37 as diaphragms 29 and 34 close. The internal pressure of the tank 37 increases in value and thereby the primary pressure in the channel 39 also increases in value. This increased primary pressure is then transmitted through the opened diaphragm 33 of the lock-up valve 25 and a connecting channel 41 into a channel 46. The pressure then passes into a fluid driven regulating valve 45 through a restriction 4 and a connection tube 43. When the signal stream pulse is removed from control gate 21, the supply from supply inlet 49 is switched back to its exhaust outlet and the diaphragms 29 and 34 open for allowing the pressure in tank 37 to exhaust through exhaust outlet 31. On the other hand, when the signal stream at outlet 19 of the oscillation unit is off and the signal stream at outlet 20 thereof is on, a signal stream pulse is applied to control gate 22. During this time, the operation of the converter unit IV which is symmetrically arranged with the converter unit III will be the same as that illustrated hereinabove.

Figure 3:
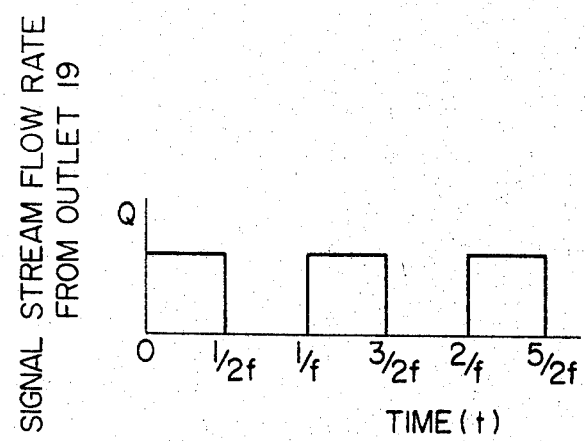
Figure 3:
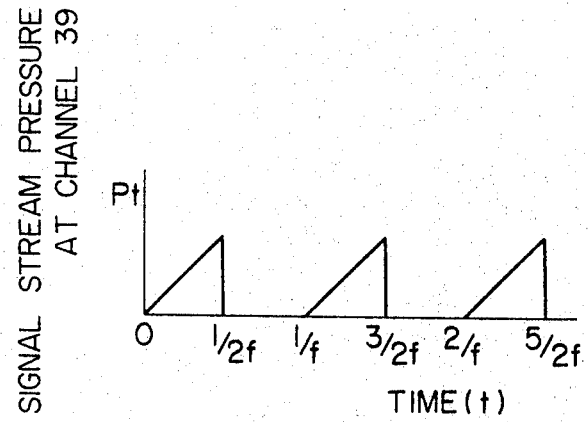

The operating condition of the signal stream flow rate at outlet 19 of the oscillation unit and the operating condition of the signal stream pressure at channel 39 of the converter unit III are shown in FIG. 3. Furthermore, the operating condition of the signal stream flow rate at outlet 20 of the oscillation unit and the operating condition of the signal stream pressure at a channel 40 of the converter unit IV are shown in FIG. 4. It will be noted that the oscillation of the oscillation unit causes the signal stream flow rate at outlet 20 and signal stream pressure at channel 40 to be offset by half a cycle to those at outlet 19 and channel 39, respectively. Accordingly, the outputs from the converter units III and IV are combined together at the channel 46 to provide a pressure to the fluid driven regulating valve 45, such as that shown in the pressure chart of FIG. 5. As illustrated hereinabove, the two converter units III and IV combine to form the output pressure which is supplied to the fluid driven regulating valve 45. The restrictions within the channels 39 and 40 and restriction 4 promote the smoothness of the output pressure.

The pressure value, P mean, of the output pressure can be expressed by the following Equation 1.

$$P\text{ mean} = \frac{1}{1/f}\int_0^{\frac{1}{f}} P_1 dt$$
$$= \frac{Q_1+Q_2+Q_3}{4cf} + (Q_3 R_4)^2 \qquad (1)$$

Wherein, $P_1$ is the fluid stream pressure at channels 39 and 40, $f$ is the frequency of the signal stream pulse, $c$ is the volume capacity of tanks 37 and 38, $R_4$ is the resistance of the restriction between either tank 37 and channel 39 or tank 38 and channel 40, and $t$ is a time. Moreover, $Q_1$, $Q_2$ and $Q_3$ are constant flow rates of the fluid supplied from control gates 21 and 22, from the supply inlets 49 and 50, and from the supply inlet 51, respectively.

The extensive operation of the process regulating system provided by the present invention will now be explained. Supposing that the volume capacities of chambers 17 and 18 is $V_C$; and that the volume of the set point bellows, 11 and 12, and the process variable sensing bellows, 15 and 16, is $V_S$ and $V_D$, respectively. In the case when the process regulating system is balanced at the set point, the volume capacity $V_F$ of the feedback loop can be expressed by the following Equation 2, provided that the volume capacities of the channels 47 and 48 is neglected:

$$V_F = V_C - (V_S + V_D) \qquad (2)$$

Then, a series of signal stream pulses with a constant frequency $f$, corresponding to the volume capacity $V_F$, is generated. These pulses are converted in the converter units III and IV to a mean pressure value, P mean, of constant magnitude under the condition expressed by Equation 1 hereinabove. Accordingly, in case of balancing the process regulating system, the pressure value, P mean, is supplied to the fluid driven regulating valve 45 to keep the opening degree thereof constant. In the explanation set forth herein, the fluid driven regulating valve 45 is driven to an open position under increasing pressure and closes under decreasing pressure; however, other arrangements are obviously possible.

When a disturbance occurs in the process being controlled by the process regulating system, the process variable thereof undergoes a change. This change causes the process variable sensing bellows 15 and 16 to expand or contract in unison for changing the volume capacity $V_D$ thereof to a volume capacity $V_D'$. Therefore, the volume capacity $V_F$ of the feedback loop will be also changed to a volume capacity $V_F'$, which can be expressed by the following Equation 3:

$$V_F' = V_C - (V_S + V_D') \qquad (3)$$

In other words, there will be provided an error in the process system as the volume capacity of the said feedback loop deviates from the balanced volume capacity $V_F$ to the new volume $V_F'$.

For example, if the line to which the fluid driven regulating valve 45 is attached were to experience an increasing pressure, this pressure increase would cause the expansion of the process variable sensing bellows 15 and 16. Thus, the volume capacity of chambers 17 and 18 would decrease. With a smaller volume in each chamber, the feedback fluid flow from control gate inlets 9 and 10 would cause the chambers to fill faster and, thus, cause a fluid flow at the control gates 1 and 2 to occur at a faster rate. On this occasion, the oscillation unit oscillates at a frequency $f'$ to follow the volume capacity $V_F'$ in the feedback loop. As the frequency increases, the flow into each pressure tank 37 and 38 is retained for a shorter period of time. Thus, the maximum internal pressure of these tanks is reduced. This causes the pressure in channel 46 to decrease and the pressure value, P mean, or the output pressure applied to regulating valve 45 to decrease to a mean pressure value, P' mean. Therefore, regulating valve 45 will reduce the opening degree thereof to cancel the increased pressure error and return the process to its set point.

When it is desired to change the set point in the process regulating system, set point bellows 11 and 12 are expanded or contracted in volume capacity by means of adjusting screws 13 and 14 to provide a deviation in the balanced process regulating system. By this deviation, the oscillation unit and the feedback loop associated therewith actuate to follow the deviation so as to change the frequency thereof and vary the opening degree of the regulating valve 45 to establish a new set point. Accordingly, the process variable sensing bellows vary in volume capacity in the reverse direction of the volume variation in the set point bellows so as to cancel the deviation and to provide a newly balanced condition in the process regulating system.

The explanation hereinabove is the construction and operation of the present invention when applied to a stream pressure control system, but it is noted that the present invention can be available in a differential pressure control system or a stream flow rate control system provided that the bellows units are modified.

What I claim is:
1. A process regulating system for controlling a process, comprising
   detection means for sensing a variation in said process and producing a volumetric change in response thereto,
   oscillating fluid amplifier means operably connected to said detection means and arranged to undergo a change of oscillation frequency upon said volumetric variation caused by said process variation,
   fluid operated digital to analogue converter means connected to said oscillating fluid amplifier means for receiving said frequency change,
   fluid driven regulating means, and
   said fluid operated digital to analogue converter means operably arranged to provide an analogue output pressure in proportion to said received oscillation frequency change for driving said fluid driven regulating means and thereby controlling said process.

2. A process regulating system for controlling a process, comprising
   volumetric detection means for sensing a variation in said process,
   oscillating fluid amplifier means having a supply nozzle and first and second outlets,
   feedback means connecting said respective first and second outlets to said supply nozzle,
   said volumetric detection means connected to said feedback means for changing the oscillation frequency of said oscillating fluid amplifier means in response to said volumetric variation thereof caused by said variation of said process,
   fluid operated digital to analogue converter means connected to said first and second outlets of said oscillating fluid amplifier means for receiving said frequency change therefrom,
   fluid driven regulating means, and
   said fluid operated digital to analogue converter means connected to said regulating means and including means for providing an analogue pressure proportional to said received oscillation frequency for driving said fluid driven regulating means and thereby controlling said process.

3. A process regulating system for controlling a process, comprising
   a pair of volumetric detection units arranged for undergoing a volumetric change in response to a variation in said process;
   an oscillating fluid amplifier having a supply nozzle and first and second outlets;
   said oscillating fluid amplifier including feedback loop means individually connecting said first and second outlets to said supply nozzle;
   said pair of volumetric detection units each connected into one of said feedback loop means for changing the oscillation frequency of said oscillating fluid amplifier in response to said volumetric variation thereof caused by said variation of said process;
   first and second fluid operated digital to analogue converter means connected to said first and second outlets of said oscillating fluid amplifier;
   said first and second fluid operated digital to analogue converter means each including a fluid amplifier having a first exhaust outlet, a second outlet, and a restricted pressure tank means having an inlet connected to said second outlet of said fluid amplifier and outlet means; and
   fluid driven regulating means commonly connected to each of said pressure tank outlet means, whereby pressure from said first and second tanks is supplied thereto for controlling said process.

4. A process regulating system for controlling a process as claimed in claim 3, additionally comprising
   said fluid amplifiers associated with said first and second fluid operated digital to analogue converter means each having a control gate connected to said first and second outlets of said oscillating fluid amplifier;
   said restricted pressure tank means each having an exhaust and first and second valve means for closing said exhaust and said outlet means, respectively;
   channel means connecting each control gate of said fluid amplifiers associated with said first and second fluid operated digital to analogue converter means to said first valve means within said first and second fluid operated digital to analogue converter means, respectively, and connecting said same control gates to said second valve means within said second and first fluid operated digital to analogue converter means, respectively; and
   a restricted channel connecting said second valve means to said fluid driven regulating means; whereby
   said pressure tank associated with said first fluid operated digital to analogue converter means provides analogue pressure to said fluid driven regulator means during the first half cycle of said oscillation frequency and said pressure tank associated with said second fluid operated digital to analogue converter means provides analogue pressure to said fluid driven regulator means during the second half cycle of said oscillation frequency.

References Cited
UNITED STATES PATENTS

| | | | |
|---|---|---|---|
| 3,155,825 | 11/1964 | Boothe | 137—81.5 X |
| 3,228,410 | 1/1966 | Warren et al. | 137—81.5 |
| 3,228,602 | 1/1966 | Boothe | 137—81.5 X |
| 3,250,285 | 5/1966 | Vockroth | 137—81.5 |
| 3,302,398 | 2/1967 | Taplin et al. | 137—81.5 |

SAMUEL SCOTT, *Primary Examiner.*